United States Patent
Roesler et al.

(10) Patent No.: US 6,809,170 B2
(45) Date of Patent: Oct. 26, 2004

(54) MOISTURE-CURABLE, POLYETHER URETHANES WITH REACTIVE SILANE GROUPS AND THEIR USE AS SEALANTS, ADHESIVE AND COATINGS

(75) Inventors: Richard R. Roesler, Wexford, PA (US); Derek L. Crawford, Oakdale, PA (US); Kurt C. Frisch, Upper St. Clair, PA (US); Karsten Danielmeier, Solingen-Burg (DE); Dinesh Pethiyagoda, Pittsburgh, PA (US); Gerhard Ruttmann, Burscheid (DE)

(73) Assignees: Bayer Materialscience LLC, Pittsburgh, PA (US); Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/690,953

(22) Filed: Oct. 22, 2003

(65) Prior Publication Data

US 2004/0127670 A1 Jul. 1, 2004

Related U.S. Application Data

(63) Continuation-in-part of application No. 10/160,479, filed on May 31, 2002, now abandoned.

(51) Int. Cl.[7] ............................................. C08G 77/26
(52) U.S. Cl. ............................... 528/28; 528/29; 528/38
(58) Field of Search ............................ 528/28, 29, 38

(56) References Cited

U.S. PATENT DOCUMENTS

| | | | |
|---|---|---|---|
| 4,857,623 A | 8/1989 | Emmerling et al. | 528/28 |
| 5,227,434 A | 7/1993 | Katz | 525/419 |
| 5,364,955 A | 11/1994 | Zwiener et al. | 556/418 |
| 5,554,709 A | 9/1996 | Emmerling et al. | 528/27 |
| 6,005,047 A | 12/1999 | Shaffer et al. | 524/590 |
| 6,197,912 B1 | 3/2001 | Huang et al. | 528/28 |
| 6,265,517 B1 * | 7/2001 | Stuart | 528/28 |
| 6,545,087 B1 | 4/2003 | Schmalstieg et al. | 525/38 |

FOREIGN PATENT DOCUMENTS

| | | |
|---|---|---|
| CA | 2325552 | 9/1999 |
| EP | 0 372 561 | 6/1990 |
| EP | 0 546 310 | 6/1993 |
| WO | 98/18843 | 5/1998 |
| WO | 02/06367 | 1/2002 |

* cited by examiner

Primary Examiner—Margaret G. Moore
(74) Attorney, Agent, or Firm—Joseph C. Gil; Gary F. Matz

(57) ABSTRACT

Preparation of moisture-curable, alkoxysilane-functional polyether urethanes by reacting at an NCO:OH equivalent ratio of 1.5:1 to 2.5:1 a) a hydroxyl component containing i) 20 to 100 wt. %, of a polyether diol and other polyether segments, where the polyether segments have Mn of at least 3000 and degree of unsaturation of less than 0.04 meq/g, where the sum of Mn of polyether segments per molecule averages 6000 to 20,000, and ii) 0 to 80 wt. % of a polyether monool and other polyether segments having Mn of 1000 to 15,000, with b) an isocyanate component containing i) 20 to 100 wt. % of a diisocyanate, and ii) 0 to 80 wt. % of a monoisocyanate, forming an isocyanate-containing reaction product reacted at an equivalent ratio of 0.8:1 to 1.1:1 with c) a compound containing an isocyanate-reactive group and reactive silane groups where at least 10 mole % is a compound of formula (I)

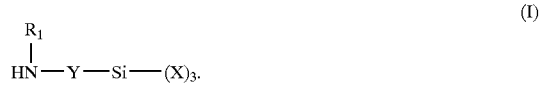

6 Claims, No Drawings

MOISTURE-CURABLE, POLYETHER URETHANES WITH REACTIVE SILANE GROUPS AND THEIR USE AS SEALANTS, ADHESIVE AND COATINGS

CROSS REFERENCE TO RELATED PATENT APPLICATION

This application is a Continuation-In-Part of U.S. Ser. No. 10/160,479, filed May 31, 2002 now abandoned.

FIELD OF THE INVENTION

The present invention relates to a process for preparing moisture-curable urethanes containing reactive silane groups from polyether polyols having a low degree of unsaturation and to the use of these polyurethanes as sealants, adhesives and coatings.

BACKGROUND OF THE INVENTION

Polyether urethanes containing reactive silane groups, also referred to as silane-terminated polyurethanes (STPs), and their use as sealants and adhesives are known and described, e.g., in U.S. Pat. Nos. 5,554,709; 4,857,623; 5,227,434 and 6,197,912; and WO 02/06367. The silane-terminated polyurethanes may be prepared by various methods. In one method the silane-terminated polyurethanes are prepared by reacting diisocyanates with polyether polyols to form isocyanate-terminated prepolymers, which are then reacted with aminosilanes to form the silane-terminated polyurethanes. The sealants may also be prepared by reacting unsaturated monools with diisocyanates to form intermediates containing unsaturated end groups and then converting these unsaturated groups to alkoxysilane groups by hydrosilylation. In another method the sealants are prepared in one step by the reaction of polyether diols with isocyanatosilanes To be useful as sealants the sitane-terminated polyurethanes should have a number average molecular weight of 6000 to 20,000. One method of obtaining this molecular weight is to use polyether diols prepared by the KOH process and having a molecular weight of 2000 to prepare the isocyanate-terminated prepolymers. The presence of urethane groups causes the products to have a high viscosity. To achieve suitable application viscosities, the high viscosity is reduced by the addition of higher amounts of plasticizer and lesser amounts of fillers, resulting in more expensive sealant products.

Another method of obtaining high molecular weight sealants is by using high molecular weight polyether diols having a low degree of unsaturation and prepared using special catalysts as described in EP-A 0,546,310, EP-A 0,372,561 and DE-A 19,908,562. When these polyether diols are used, the resulting sealants have excellent tensile strength, but the sealants are too brittle for many applications because the elongation is too low and the 100% modulus is too high.

The preparation of sealants from mixtures of polyfunctional and monofunctional silane-terminated polyurethanes is known and disclosed in U.S. Pat. Nos. 5,554,709 and 4,857,623 and WO 02/06367. However, these references do not disclose the use of polyether polyols having a low degree of unsaturation and aspartate-functional silanes to prepare the sealants.

The preparation of silane-terminated polyether urethanes from aspartate-functional silanes is disclosed in U.S. Pat. No. 5,364,955 and WO 98/18843. In both of these references the polyethers used to prepare polyether urethanes do not have a low degree of unsaturation. In addition, mixtures of polyfunctional and monofunctional silane-terminated polyurethanes are not disclosed. Finally, in the latter reference the polyethers must contain 15 to 40% by weight of ethylene oxide units.

WO 00/26271 discloses the preparation of silane-terminated polyether urethanes from polyether polyols having a low degree of unsaturation and aspartate-functional silanes. The products are prepared by reacting diisocyanates with high molecular weight polyether diols to form NCO prepolymers, which are then capped with aspartate-functional silanes to form silane-terminated polyether urethanes. This application does not disclose mixtures of disilane-terminated polyether urethanes with polyether urethanes containing one reactive silane group.

U.S. Pat. No. 6,265,517 describes a similar process for preparing silane-terminated polyether urethanes from polyether polyols having a low degree of unsaturation and aspartate-functional silanes. The patent requires the starting polyol to have a monool content of less than 31 mole %, and teaches that a relatively high monool content is highly undesirable because monools react with isocyanates thereby reducing crosslinking and curing of the prepolymer. The patent also requires the aspartate silanes to be prepared from dialkyl maleates in which the alkyl groups each contain more than four carbon atoms.

EP 0,372,561 discloses polyether urethanes containing reactive silane groups and prepared from polyether polyols having a low degree of unsaturation. In addition, polyether urethanes containing one reactive silane group are disclosed. This application fails to disclose the use of aspartate-functional silanes to incorporate the reactive silane groups.

The deficiencies of the preceding sealants was overcome in copending applications, Ser. Nos. 10/160,479, 10/174,039, 10/173,919, and 10/160,364, which describe moisture-curable, alkoxysilane-functional polyether urethanes containing both polyether urethanes having two or more reactive silane groups and polyether urethanes having one reactive silane group. The moisture-curable polyether urethanes are suitable for use as sealants, adhesives and coatings which possess high tensile strengths and elongations and have a reduced 100% modulus when compared with existing products In the copending applications the polyether urethane component containing two or more reactive silane groups are prepared from high molecular weight polyether polyols having a low degree of unsaturation. In addition, at least a portion of the reactive silane groups present in at least one of the two components are incorporated by the use of silanes containing secondary amino groups. Finally, the polyether urethane components described in the copending applications are prepared separately and subsequently blended to form the moisture-curable polyether urethanes according to the invention.

One of the disadvantages of these moisture-curable polyether urethanes is that even though the blended product has a low viscosity, the polyether urethane component containing two or more reactive silane groups has a high viscosity and is more difficult to prepare than a lower viscosity product.

Accordingly, it is an object of the present invention to provide moisture-curable polyether urethanes that can be prepared at lower production viscosities and still retain all of the valuable properties of the polyether urethanes disclosed in the copending applications, i.e., the products are suitable for use as sealants, adhesives and coatings which possess high tensile strengths and elongations and have a reduced 100% modulus.

This object may be achieved with process of the present invention in which the moisture-curable polyether urethanes containing a mixture of polyether urethane component having two or more reactive silane groups and a polyether urethane component having one reactive silane group are prepared simultaneously instead of being prepared separately and mixed.

It is surprising that the polyether urethanes obtained according to the process of present invention possess the same properties as the products obtained in accordance with the copending applications because a greater variety of by-products are obtained according to the present invention and it could not be predicted that the presence of these by-products would not affect the valuable properties of the moisture-curable polyurethanes.

SUMMARY OF THE INVENTION

The present invention relates to a process for preparing a moisture-curable, alkoxysilane-functional polyether urethane by reacting at an NCO:OH equivalent ratio of 1.5:1 to 2.5:1
a) a hydroxyl component containing
  i) 20 to 100% by weight, based on the weight of component a), of a polyether containing two hydroxyl groups and one or more polyether segments, wherein the polyether segments have a number average molecular weight of at least 3000 and a degree of unsaturation of less than 0.04 milliequivalents/g, provided that the sum of the number average molecular weights of all of the polyether segments per molecule averages 6000 to 20,000, and
  ii) 0 to 80% by weight, based on the weight of component a), of a polyether containing one hydroxyl group and one or more polyether segments having a number average molecular weight of 1000 to 15,000, with
b) an isocyanate component containing
  i) 20 to 100% by weight, based on the weight of component b), of a compound containing two isocyanate groups, and
  ii) 0 to 80% by weight, based on the weight of component b), of a compound containing one isocyanate group,
to form an isocyanate-containing reaction product and subsequently reacting this reaction product at an equivalent ratio of isocyanate groups to isocyanate-reactive groups of 0.8:1 to 1.1:1 with
c) a compound containing an isocyanate-reactive group and one more reactive silane groups in which at least 10 mole % of component c) is a compound corresponding to the formula

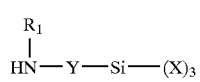
(I)

wherein
X represents identical or different organic groups which are inert to isocyanate groups below 100° C., provided that at least two of these groups are alkoxy or acyloxy groups,
Y represents a linear or branched alkylene group containing 1 to 8 carbon atoms and
R₁ represents an organic group which is inert to isocyanate groups at a temperature of 100° C. or a group corresponding to formula II

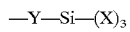
(II)

to form a moisture-curable, alkoxysilane-functional polyether urethane, provided that total percentages of a-ii) and b-ii) add up to at least 10.

DETAILED DESCRIPTION OF THE INVENTION

In accordance with the present invention the term "reactive silane group" means a silane group containing at least two alkoxy or acyloxy groups as defined by substituent "X". A silane group containing two or three alkoxy and/or acyloxy groups is considered to be one reactive silane group. Also, a urethane is a compound containing one or more urethane and/or urea groups. These compounds preferably contain one or more urethane groups and may optionally contain urea groups. More preferably, these compounds contain both urethane and urea groups.

The isocyanate-containing reaction products used for preparing the moisture-curable polyether urethanes may be prepared by several methods. For example, they may be prepared by reacting a mixture of polyether diol a-i) and polyether monool a-ii) with an excess of diisocyanate b-i), to form an isocyanate-containing reaction product containing NCO prepolymers and monoisocyanates formed by the reaction of one mole of a diisocyanate with one mole of a polyether monool. In this embodiment polyether monool a-ii) is present in an amount of at least 10% by weight, based on the weight of component a).

In another embodiment the isocyanate-containing reaction products are prepared by reacting polyether diol a-i) with an excess of diisocyanate b-i) and monoisocyanate b-ii) to form an isocyanate-containing reaction product containing NCO prepolymers and monoisocyanates formed by the reaction of one mole of a monoisocyanate with one mole of a polyether diol. In this embodiment monoisocyanate b-ii) is present in an amount of at least 10% by weight, based on the weight of component b).

It is also possible to use a combination of the preceding processes in which both polyether monools a-ii) and monoisocyanates b-ii) are present.

The isocyanate-containing reaction products are prepared by reacting the isocyanate component with the polyether component at an NCO:OH equivalent ratio of a 1.5:1 to 2.5:1, preferably 1.8:1 to 2.2:1 and more preferably 1.9:1 to 2.1:1 and most preferably 2:1. It is especially preferred to react one mole of the isocyanate component for each equivalent of hydroxyl groups.

When preparing the isocyanate-containing reaction product from diisocyanate b-i), polyether diol a-i) and polyether monool a-ii) at an NCO:OH equivalent ratio of 2:1, the reaction mixture contains the 2/1 adduct of the diisocyanate and diol; minor amounts of higher molecular weight oligomers, such as the 3/2 adduct; a monoisocyanate, which is the 1/1 adduct of the monool and diisocyanate; non-functional polymers, which are formed by the reaction of two molecules of the monool with one molecule of the diisocyanate; various products containing both diols and monools; and a minor amount of unreacted diisocyanate, which can be removed, e.g., by distillation, or which can remain in the reaction mixture.

To form the moisture-curable polyether urethanes according to the invention the isocyanate-containing reaction products are reacted with compounds c) containing reactive silane groups at equivalent ratio of isocyanate groups to isocyanate-reactive groups of 0.8:1 to 1.1:1, preferably 0.9:1 to 1.05:1 and more preferably about 1:1.

The moisture-curable polyether urethanes may also be prepared by reacting an excess of diisocyanates b) with aminosilanes c) to form a monoisocyanate and then reacting the resulting monoisocyanate with a mixture of polyethers a-i) and a-ii) to form the polyether urethanes.

The moisture-curable, polyether urethanes obtained according to the process of the present invention contain polyether urethanes A), which contain two or more, preferably two, reactive silane groups, and polyether urethanes B), which contain one reactive silane group. Also present are polymers C), which are the reaction products of unreacted isocyanates b) with aminosilanes c). Polymers C) are preferably present in an amount of less then 5% by weight.

The reaction mixture also contains non-functional polymers D), which are formed by the reaction of two molecules of the monool with one molecule of the diisocyanate, two molecules of the monoisocyanate with one molecule of the diol, or one molecule of the monool with one molecule of a monoisocyanate. Non-functional polymers D) are generally present in an amount of less than 30% by weight.

In accordance with the present invention it is also possible to adjust the NCO:OH equivalent ratio to form additional amounts of non-functional polymers D) are formed from the reactants as previously described. These polymers remain in the reaction mixture and function as plasticizers during the subsequent use of the moisture-curable, polyether urethanes according to the invention.

Suitable polyethers for use as component a-i) include polyethers containing two hydroxyl groups and optionally up to 20% by weight, based on the weight of component a-i), of polyethers containing more than 2 hydroxyl groups. In an embodiment of the invention, the polyethers contain one or more, in some cases one, polyether segment. The polyether segments have a number average molecular weight of at least 3000, in some cases at least 6000 and in other cases at least 8000. Also, the number average molecular weight of the poly ether segment can be up to 20,000, in some cases up to 15,000 and in other cases up to 12,000. The number average molecular weight of the polyether segments can vary and range between any of the values recited above. As a non-limiting example, when the polyether segments have a number average molecular weight of 3000, then two or more of these segments must be present to provide that the number average molecular weights of all of the polyether segments per molecule averages between 6000 to 20,000.

The polyethers have a maximum total degree of unsaturation of less than 0.04 milliequivalents/g (meq/g) in some cases less than 0.02 meq/g, in other cases less than 0.01 meq/g and in some situations 0.007 meq/g or less. The amount of unsaturation will vary depending on the method used to prepare the polyether as well as the molecular weight of the polyerther. Such polyether diols are known and can be produced by, as a non-limiting example, the propoxylation of suitable starter molecules. As another non-limiting example, minor amounts (up to 20% by weight, based on the weight of the polyol) of ethylene oxide can be used. If ethylene oxide is used, it can be used as the initiator for or to cap polypropylene oxide groups. Non-limiting examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable methods for preparing polyether polyols are known and are described, for example, in EP-A 283 148; U.S. Pat. Nos. 3,278,457; 3,42,256; 3,829,505; 4,472,560; 3,278,458; 3,427,334; 3,941,849; 4,721,818; 3,278,459; 3,427,335 and 4,355,188. They are preferably prepared using double metal cyanides as catalysts.

In addition to the polyether polyols, minor amounts (up to 20% by weight, based on the weight of the polyol) of low molecular weight dihydric and trihydric alcohols having a molecular weight 32 to 500 can also be used. Suitable examples include ethylene glycol, 1,3-butandiol, 1,4-butandiol, 1,6-hexandiol, glycerine or trimethylolpropane. However, the use of low molecular weight alcohols is less preferred.

Polyethers a-i) are present in a amount of up to 100% by weight. When polyether monools a-ii) are used as the sole monofunctional component, polyethers a-i) are present in a minimum amount of 20% by weight, preferably 30% by weight and more preferably 40% by weight, and a maximum amount of 90% by weight, preferably 80% by weight and more preferably 70% by weight. The preceding percentages are based on the total weight of polyethers a).

Suitable polyether monools a-ii) are polyether monools having a number average molecular weight of 1000 to 15,000, preferably 3000 to 12,000 and more preferably 6000 to 12,000. The polyether monools are prepared by the alkoxylation of monofunctional starting compounds with alkylene oxides, preferably ethylene oxide, propylene oxide or butylene oxide, more preferably propylene oxide. If ethylene oxide is used, it is used in an amount of up to 40% by weight, based on the weight of the polyether. The polyethers are preferably prepared either by the KOH process or by mixed metal cyanide catalysts. The latter process results in products with low a degree of unsaturation.

Preferably, the polyethers have a maximum total degree of unsaturation of less than 0.04 milliequivalents/g (meq/g) in some cases less than 0.02 meq/g, in other cases less than 0.01 meq/g and in some situations 0.007 meq/g or less. The amount of unsaturation will vary depending on the method used to prepare the polyether as well as the molecular weight of the polyerther. These polyether monools are known and can be produced by the methods set forth previously for preparing the polyether polyols, as a non-limiting example by the propoxylation of suitable starter molecules. In another non-limiting example, minor amounts (up to 20% by weight, based on the weight of the polyol) of ethylene oxide can also be used. As with the polyethers a-i), if ethylene oxide is used, it can be used as the initiator for or to cap the polypropylene oxide groups.

Examples of suitable starter molecules include aliphatic, cycloaliphatic and araliphatic alcohols, phenol and substituted phenols, such as methanol, ethanol, the isomeric propanols, butanols, pentanols and hexanols, cyclohexanol and higher molecular weight compounds such as nonylphenol, 2-ethylhexanol and a mixture of $C_{12}$ to $C_{15}$, linear, primary alcohols (Neodol 25, available from Shell). Also suitable are unsaturated alcohols such as allyl alcohol; and hydroxy functional esters such as hydroxyethyl acetate and hydroxyethyl acrylate. Preferred are the higher molecular weight monohydroxy compounds, especially nonyl phenol and mixtures of $C_{12}$ to $C_{15}$, linear, primary alcohols.

When polyethers a-ii) are present as the sole monofunctional component, they are preferably present in a minimum amount of 10% by weight, more preferably 20% by weight and most preferably 30% by weight, and a maximum amount of 80% by weight, preferably 70% by weight and more preferably 60% by weight. The preceding percentages are based on the total weight polyethers a).

Suitable isocyanates b-i) include the known monomeric organic diisocyanates represented by the formula, $R(NCO)_2$, in which R represents an organic group obtained by removing the isocyanate groups from an organic diisocyanate having a molecular weight of 112 to 1,000, preferably 140 to 400. Preferred diisocyanates are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclo-hexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used in an amount of up to 20% by weight, based on the weight of isocyanates b). Also suitable, although less preferred, are polyisocyanate adducts prepared from the preceding monomeric polyisocyanates and containing isocyanurate, uretdione, biuret, urethane, allophanate, iminooxadiazine dione, carbodiimide and/or oxadiazinetrione groups.

Preferred diisocyanates include bis-(4-isocyanatocyclohexyl)-methane, 1,6-hexamethylene diisocyanate, isophorone diisocyanate, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate. Especially preferred are isophorone diisocyanate, 2,4-toluylene diisocyanate and mixtures of 2,4- and 2,6-toluylene diisocyanate.

Diisocyanates b-i) are present in a amount of up to 100% by weight. When monoisocyanates b-ii) are used as the sole monofunctional component, diisocyanates b-i) are present in a minimum amount of 20% by weight, preferably 30% by weight and more preferably 40% by weight, and a maximum amount of 90% by weight, preferably 80% by weight and more preferably 70% by weight. The preceding percentages are based on the total weight of isocyanates b).

Suitable isocyanates b-ii) include those corresponding to the formula R(NCO), wherein R is defined as previously set forth with regard to the organic diisocyanates. Suitable monoisocyanates include those corresponding to the diisocyanates previously set forth. Examples include butyl isocyanate, hexyl isocyanate, octyl isocyanate, 2-ethylhexyl isocyanate, stearyl isocyanate, cyclohexyl isocyanate, phenyl isocyanate and benzyl isocyanate.

When monoisocyanates b-ii) are present as the sole monofunctional component, they are preferably present in a minimum amount of 10% by weight, more preferably 20% by weight and most preferably 30% by weight, and a maximum amount of 80% by weight, preferably 70% by weight and more preferably 60% by weight. The preceding percentages are based on the total weight isocyanates b).

Suitable compounds c) containing reactive silane groups are those corresponding to formula I

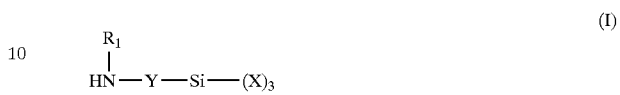

wherein

X represents identical or different organic groups which are inert to isocyanate groups below 100° C., provided that at least two of these groups are alkoxy or acyloxy groups, preferably alkyl or alkoxy groups having 1 to 4 carbon atoms and more preferably alkoxy groups, Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms and $R_1$ represents an organic group which is inert to isocyanate groups at a temperature of 100° C. or less, provided that $R_1$ is not a succinate group, preferably an alkyl, cycloalkyl or aromatic group having 1 to 12 carbon atoms and more preferably an alkyl, cycloalkyl or aromatic group having 1 to 8 carbon atoms, or $R_1$ represents a group corresponding to formula II

Especially preferred are compounds in which X represents methoxy, ethoxy groups or propoxy groups, more preferably methoxy or ethoxy groups, and Y is a linear group containing 3 carbon atoms.

Examples of suitable aminoalkyl alkoxysilanes and aminoalkyl acyloxysilanes of formula I, which contain secondary amino groups, include N-phenylaminopropyl-trimethoxysilane (available as A-9669 from OSI Corporation), bis-(γ-trimethoxysilylpropyl)amine (available as A-1170 from OSI Corporation), N-cyclohexylaminopropyl-triethoxysilane, N-methylaminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane and the corresponding alkyl diethoxy, alkyl dimethoxy and alkyl diacyloxysilanes, such as 3-(N-ethyl)amino-2-methylpropyl-methyldimethoxysilane.

A special group of compounds containing alkoxysilane groups, which correspond to formula I and are especially preferred for use as compounds c), are those containing aspartate groups and corresponding to formula III

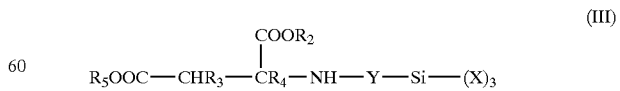

wherein

X and Y are as previously defined, $R_2$ and $R_5$ are identical or different and represent organic groups which are inert to isocyanate groups at a temperature of 100° C. or less, preferably alkyl groups having 1 to 9 carbon atoms, more preferably alkyl groups having 1 to 4 carbon atoms, such as methyl, ethyl or butyl groups and $R_3$ and $R_4$ are identical or different and represent hydrogen or organic groups which are inert towards isocyanate groups at a temperature of 100° C. or less, preferably hydrogen.

The compounds of formula III are prepared by reacting aminosilanes corresponding to formula IV

with maleic or fumaric acid esters corresponding to formula V

Examples of suitable aminoalkyl alkoxysilanes and aminoalkyl acyloxysilanes corresponding to formula IV include 3-aminopropyl-triacyloxysilane, 3-aminopropyl-methyldimethoxysilane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane; 4-amino-3,3-dimethyl-butyl-trimethoxysilane; and 3-aminopropyl-triisopropoxysilane. 3-amino-propyl-trimethoxysilane and 3-aminopropyl-triethoxysilane are particularly preferred.

Examples of optionally substituted maleic or fumaric acid esters suitable for preparing the aspartate silanes include the dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred, while the diethyl esters are especially preferred.

The reaction of primary amines with maleic or fumaric acid esters to form the aspartate silanes of formula III is known and described, e.g., in U.S. Pat. No. 5,364,955, which is herein incorporated by reference.

The compounds corresponding to formula I are preferably used as component c). To obtain the benefits of the present invention, they should be present in an amount of at least 10% by weight, preferably at least 30% by weight, more preferably at least 50% by weight and most preferably at least 80% by weight. In addition to the compounds of formula I, which are required according to the present invention, component c) may also contain aminosilanes that do not correspond to formula I, such as the primary aminosilanes corresponding to formula IV.

The compositions obtained by the process of the present invention may be cured in the presence of water or moisture to prepare coatings, adhesives or sealants. The compositions cure by "silane poly-condensation" from the hydrolysis of alkoxysilane groups to form Si—OH groups and their subsequent reaction with either Si—OH or Si—OR groups to form siloxane groups (Si—O—Si).

Suitable acidic or basis catalysts may be used to promote the curing reaction. Examples include acids such as para-toluene sulfonic acid; metallic salts such as dibutyl tin dilaurate; tertiary amines such as triethylamine or triethylene diamine; and mixtures of these catalysts. The previously disclosed, low molecular weight, basic aminoalkyl trialkoxysilanes, also accelerate hardening of the compounds according to the invention.

The one-component compositions generally may be either solvent-free or contain up to 70%, preferably up to 60% organic solvents, based on the weight of the one-component composition, depending upon the particular application. Suitable organic solvents include those which are known from either from polyurethane chemistry or from coatings chemistry.

The compositions may also contain known additives, such as leveling agents, wetting agents, flow control agents, antiskinning agents, antifoaming agents, fillers (such as chalk, lime, flour, precipated and/or pyrogenic silica, aluminum silicates and high-boiling waxes), viscosity regulators, plasticizers, pigments, dyes, UV absorbers and stabilizers against thermal and oxidative degradation.

The one-component compositions may be used with any desired substrates, such as wood, plastics, leather, paper, textiles, glass, ceramics, plaster, masonry, metals and concrete. They may be applied by standard methods, such as spraying, spreading, flooding, casting, dipping, rolling and extrusion.

The one-component compositions may be cured at ambient temperature or at elevated temperatures. Preferably, the moisture-curable compositions are cured at ambient temperatures.

The invention is further illustrated but is not intended to be limited by the following examples in which all parts and percentages are by weight unless otherwise specified.

EXAMPLES

Preparation of Silane Functional Aspartate 1

An aspartate resin was prepared according to U.S. Pat. No. 4,364,955. To a 5 liter flask fitted with agitator, thermocouple, nitrogen inlet and addition funnel with condenser were added 1483 g (8.27 equivalents) of 3-amino-propyl-trimethoxysilane (Silquest A-1110, available from OSI Corporation). The addition funnel was used to admit 1423.2 g (8.27 equivalents) of diethyl maleate over a two hour period. The temperature of the reactor was maintained at 25° C. during the addition. The reactor was maintained at 25° C. for an additional five hours at which time the product was poured into glass containers and sealed under a blanket of nitrogen. After one week the unsaturation number was 0.6 indicating the reaction was ~99% complete.

Polyether Diol 1

A polyoxypropylene diol (Acclaim 12200 (unsaturation= 0.007 meq/g), available from Bayer Corporation) having a functionality of 2 and an equivalent weight of 5783.

Polyether Monool 2

Nonylphenol (183 g, 0.89 eq) was charged to a stainless-steel reactor. Zinc hexacyanocobaltate-tert-butyl alcohol complex (0.143 g, prepared as described in U.S. Pat. No. 5,482,908) was added and the mixture was heated with stirring under vacuum at 130° C. for one hour to remove traces of water from the nonylphenol starter. Propylene oxide (6407 g, 145.6 eq) was introduced into the reactor over 6 hours. After the epoxide addition was completed, the mixture was heated to 130° C. until no further pressure decrease occurred. The product was vacuum stripped and then drained from the reactor. The resulting polyether had an OH number of 8.5, an equivalent weight of 6612 and a functionality of 1.

Example 1—Preparation Silane Terminated
Polyurethane (STP) 1 in situ from a 74:26
diol:monool Mixture A 2 liter round bottom flask was fitted with agitator, nitrogen inlet, condenser, heater and addition funnel. Into the flask were charged 36.2 g (0.33 eq) of isophorone diisocyanate, 733.9 g (0.13 eq) of polyether diol 1, 264.5 g (0.04 eq) of polyether monool 2 and 0.23 g of dibutyltin dilaurate. The reaction was heated to 60° C. for 8 hours until the NCO content was 0.57% (theoretical=0.66%). 59.7 g (0.16 eq) of silane functional aspartate 1 were added and the flask was heated at 60° C. for an additional 1 hour until no NCO remained as determined by an IR spectrum. 5.5 g of vinyl trimethoxysilane were added as moisture scavenger. The resulting product had a viscosity of 34,700 mPa.s at 25° C.

Example 2—Preparation Silane Terminated Polyurethane (STP) 2 in situ from a 60:40 diol:monool Mixture A 2 liter round bottom flask was fitted with agitator, nitrogen inlet, condenser, heater and addition funnel. Into the flask were charged 35.33 g (0.32 eq) of isophorone diisocyanate, 602.3 g (0.10 eq) of polyether diol 1, 400.5 g (0.06 eq) of polyether monool 2 and 0.22 g of dibutyltin dilaurate. The reaction was heated to 60° C. for 8 hours until the NCO content was 0.61% (theoretical=0.64%). 51.6 g (0.16 eq) of silane functional aspartate 1 were added and the flask was heated at 60° C. for an additional 1 hour until no NCO remained as determined by an IR spectrum. 5.5 g of vinyl trimethoxysilane were added as moisture scavenger. The resulting product had a viscosity of 31,500 mPa.s at 25° C.

Example 3—Preparation Silane Terminated Polyurethane (STP) 3 in situ from a 50:50 diol:monool Mixture Example 2 was repeated with the exception that 34.55 g (0.31 eq) of isophorone diisocyanate, 502.0 g (0.087 eq) of polyether diol 1, 502.2 g (0.069 eq) of polyether monool 2 and 56.9 g (0.16 eq) of silane functional aspartate 1 were used. The resulting product had a viscosity of 39,000 mPa.s at 25° C.

Example 4—Preparation Silane Terminated Polyurethane (STP) 4 in situ from a 40:60 diol:monool Mixture Example 2 was repeated with the exception that 95.1 g (0.43 eq) of isophorone diisocyanate, 1134 g (0.20 eq) of polyether diol 1, 1700.4 g (0.233 eq) of polyether monool 2 and 160.2 g (0.43 eq) of silane functional aspartate 1 were used. The resulting product had a viscosity of 27,700 mPa.s at 25° C.

Example 5 (Comp)—Preparation of Silane Terminated Polyurethane (STP) 5

A 5 liter round bottom flask was fitted with agitator, nitrogen inlet, condenser, heater and addition funnel. Into the flask were charged 139.3 g (1.26 eq) of isophorone diisocyanate, 3643.3 g (0.63 eq) of polyether diol 1 and 0.8 g of dibutyltin dilaurate. The reaction was heated to 60° C. for 3 hours until the NCO content was 0.72% (theoretical=0.70%). 229.8 g (0.63 eq) of silane functional aspartate 1 were added and the flask was heated at 60° C. for an additional 1 hour until no NCO remained as determined by an IR spectrum. 20 g of vinyl trimethoxysilane were added as moisture scavenger. The resulting product had a viscosity of 73,000 mPa.s at 25° C.

Example 6 (Comp)—Preparation of Silane Terminated Polyurethane (STP) 6

A 5 liter round bottom flask was fitted with agitator, nitrogen inlet, condenser, heater and addition funnel. Into the flask were charged 150.9 g (1.14 eq) of isophorone diisocyanate, 3664.1 g (0.57 eq) of polyether monool 2 and 0.6 g dibutyltin dilaurate. The reaction was heated to 60° C. for 3 hours until the NCO content was 0.65% (theoretical= 0.63%). 202.2 g (0.57 eq) of silane functional aspartate 1 were added and the flask was heated at 60° C. for an additional 1 hour until no NCO remained as determined by an IR spectrum. 20 g of vinyl trimethoxysilane were added as moisture scavenger. The resulting product had a viscosity of 16,100 mPa.s at 25° C.

Formulation of Silane Sealants

The STP's prepared in situ were formulated into sealants using the following typical formulation and procedure. Comparison STP's 5 and 6 were formulated at a 70:30 ratio.

Procedure

The following is the standard sealant formulation and procedure used to formulate all of the STP's for testing. Values given for each formula component are percent by weight of the total formula weight. A high-speed centrifugal mixer was used to mix the formulation components in the steps given below. Each mixing period was one minute in length at a speed of 2200 rpm.

Step 1:

To a clean dry mixing container were charged the following:

| | |
|---|---|
| STP (blend) | 37.5 |
| Plasticizer | 17.5 |
| Adhesion Promoter | 0.8 |
| Catalyst | 0.1 |
| Desiccant | 0.5 |

The ingredients were mixed for one minute in length at a speed of 2200 rpm.

Step 2:

A portion of the filler was added to the mixing container.

Filler 23.6

The ingredients were mixed for one minute at a speed of 2200 rpm.

Step 3:

The remaining filler was added to the mixing container.

Filler 20.0

The ingredients were mixed for one minute in length at a speed of 2200 rpm.

Step 4:

The side of the mix container was scraped and the ingredients were mixed for one additional minute at a speed of 2200 rpm to incorporate all of the filler into the mixture.

Step 5:

The resulting product was degassed at 50° C. and under full vacuum (>28 mm Hg) for one hour. The material was used immediately.

Exxon Jayflex DIDP was used as the plasticizer. An aminosilane (Silquest A-1120, available from OSI Corporation) was used as the adhesion promoter. A vinyltrimethoxysilane (Silquest A-171, available from OSI Corporation) was used as the desiccant. The filler used was Specialty Minerals Ultra P Flex precipitated calcium carbonate (mean particle size of 0.07 microns). The catalyst used was dibutyltin dilaurate.

Cure and Testing of Silane Sealants

The sealant formulations were cast onto 0.25 inch thick polyethylene sheets and cured at standard conditions of 20° C., 50% relative humidity for at least two weeks before testing. Tensile strength, percent elongation and 100% modulus were determined according to ASTM D-412. The results are set forth in the following table.

Examples 1-95

Properties for the Sealants

| Example | In situ STP | Diol STP | Monool STP | Diol/ Monool Ratio | Ultimate Tensile Strength (psi) | Modulus @ 100% Elongation (psi) | Elongation (%) |
|---|---|---|---|---|---|---|---|
| 7 | 1 | — | — | 70:30 | 305 | 151 | 359 |
| 8 | 2 | — | — | 60:40 | 248 | 119 | 339 |
| 9 | 3 | — | — | 50:50 | 235 | 92 | 358 |
| 10 | 4 | — | — | 40:60 | 198 | 76 | 356 |
| 11 (Comp) |  | 5 (Comp) | 6 (Comp) | 70:30 | 381 | 165 | 392 |

The preceding examples demonstrate that the sealant properties for the products prepared by the in situ process according to the invention are comparable to the properties obtained by separately preparing and blending the silane-terminated polyurethanes used in the sealant compositions, even though the products according to the invention contain by-products that are not present in the comparison sealant.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A process for preparing a moisture-curable, alkoxysilane-functional polyether urethane by reacting at an NCO:OH equivalent ratio of 1.5:1 to 2.5:1 a) a hydroxyl component containing
        i) 20 to 60% by weight, based on the weight of component a), of a polyether containing two hydroxyl groups and one or more polyether segments, wherein the polyether segments have a number average molecular weight of at least 3000 and a degree of unsaturation of less than 0.04 milliequivalents/g, provided that the sum of the number average molecular weights of all of the polyether segments per molecule averages 6000 to 20,000, and
        ii) 40 to 80% by weight, based on the weight of component a), of a polyether containing one hydroxyl group and one or more polyether segments having a number average molecular weight of 1000 to 15,000, with
    b) an isocyanate component containing
        i) 20 to 100% by weight, based on the weight of component b), of a compound containing two isocyanate groups, and
        ii) 0 to 80% by weight, based on the weight of component b), of a compound containing one isocyanate group, to form an isocyanate-containing reaction product and subsequently reacting this reaction product at an equivalent ratio of isocyanate groups to isocyanate-reactive groups of 0.8:1 to 1.1:1 with c) compounds containing an isocyanate-reactive group and one or more reactive silane groups selected from i) compounds corresponding to formula I

wherein
    X represents identical or different organic groups which are inert to isocyanate groups below 100° C., provided that at least two of these groups are alkoxy or acyloxy groups,
    Y represents a linear or branched alkylene group containing 1 to 8 carbon atoms and
    $R_1$ represents an organic group selected from alkyl, cycloalkyl or aromatic groups having from 1 to 12 carbon atoms and a group corresponding to formula II

and
    ii) the reaction product of aminosilanes corresponding to formula IV

with maleic or fumaric acid esters corresponding to formula V

wherein X and Y are as defined above,
    $R_2$ and $R_5$ are identical or different and represent alkyl groups having 1 to 4 carbon atoms, and
    $R_3$ and $R_4$ are identical or different and represent hydrogen or organic groups which are inert towards isocyanate groups at a temperature of 100° C. or less, to form a moisture-curable, alkoxysilane-functional polyether urethane.

2. The process of claim 1 wherein
    X represents identical or different alkoxy groups having 1 to 4 carbon atoms,
    Y represents a linear radical containing 2 to 4 carbon atoms or a branched radical containing 5 to 6 carbon atoms and
    $R_1$ represents ethyl.

3. The process of claim 1 wherein at least 10 mole % of component c) is a compound corresponding to the formula

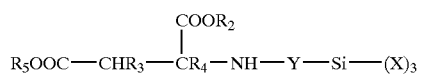 (III)

wherein

X represents identical or different alkoxy groups having 1 to 4 carbon atoms

Y represents a linear radical containing 2 to 4 carbon atoms or a branched radical containing 5 to 6 carbon atoms and $R_2$ and $R_5$ are identical or different and represent alkyl groups having 1 to 4 carbon atoms and $R_3$ and $R_4$ represent hydrogen.

4. The process of claim 1 wherein the polyether segments of component a-i) have a number average molecular weight of at least 6000 and the polyether segments of component a-ii) have a number average molecular weight of 3000 to 12,000.

5. The process of claim 2 wherein the polyether segments of component a-i) have a number average molecular weight of at least 6000 and the polyether segments of component a-ii) have a number average molecular weight of 3000 to 12,000.

6. The process of claim 3 wherein the polyether segments of component a-i) have a number average molecular weight of at least 6000 and the polyether segments of component a-ii) have a number average molecular weight of 3000 to 12,000.

* * * * *